(12) United States Patent
Wang

(10) Patent No.: US 12,428,149 B2
(45) Date of Patent: Sep. 30, 2025

(54) MULTIROTOR AERIAL VEHICLE WITH TILTABLE ROTOR BOOM

(71) Applicant: Xi Wang, Saint-Laurent (CA)

(72) Inventor: Xi Wang, Saint-Laurent (CA)

( * ) Notice: Subject to any disclaimer, the term of this patent is extended or adjusted under 35 U.S.C. 154(b) by 65 days.

(21) Appl. No.: 18/227,972

(22) Filed: Jul. 30, 2023

(65) Prior Publication Data

US 2025/0145283 A1   May 8, 2025

(51) Int. Cl.
*B64C 29/00*   (2006.01)

(52) U.S. Cl.
CPC ............................. *B64C 29/0033* (2013.01)

(58) Field of Classification Search
CPC .................................................. B64C 29/0033
See application file for complete search history.

(56) References Cited

U.S. PATENT DOCUMENTS

| | | | |
|---|---|---|---|
| 3,053,480 A | 9/1962 | Vanderlip | |
| 6,293,491 B1 * | 9/2001 | Wobben | B64C 29/0025 244/17.23 |
| 11,130,566 B2 | 9/2021 | Mikic | |
| 2004/0195433 A1 * | 10/2004 | Kayama | B64C 29/0025 244/10 |
| 2015/0344134 A1 * | 12/2015 | Cruz Ayoroa | B64C 29/0033 244/48 |
| 2016/0207625 A1 * | 7/2016 | Judas | B64U 10/20 |
| 2020/0317332 A1 * | 10/2020 | Didey | B64C 39/08 |
| 2022/0089279 A1 | 3/2022 | Rosen | |
| 2022/0258859 A1 | 8/2022 | Bianco Mengotti | |
| 2022/0388648 A1 * | 12/2022 | Wang | B64C 25/32 |
| 2022/0402603 A1 | 12/2022 | Frank | |
| 2024/0002048 A1 * | 1/2024 | Wang | B64D 27/40 |

* cited by examiner

*Primary Examiner* — Tye William Abell

(57) ABSTRACT

A rotorcraft with distributed propulsion system having the capability to transition between two configurations suitable for thrust borne VTOL (vertical take-off and landing) flight and partial wing borne airplane flight. The rotorcraft includes a fuselage, an empennage, a vertical stabilizer, a rudder, a pair of wings, a pair of flaps, a pair of canards, a pair of pylons, a pair of tiltable rotor booms and a plurality of rotors. The tiltable rotor booms are associated with an actuator to change collectively the direction of the rotor thrust vector with respect to the fuselage. The rotor can be open rotor or ducted rotor. The rotor booms oriented in the canted position is the first configuration suitable for partial wing borne flight and the rotor booms oriented in the horizontal position is the second configuration suitable for thrust borne flight.

19 Claims, 11 Drawing Sheets

MULTIROTOR AERIAL VEHICLE WITH TILTABLE ROTOR BOOM

FIELD OF THE INVENTION

The disclosed invention relates to an aerial vehicle capable of thrust borne flight for VTOL (vertical take-off and landing) mode and partial wing borne flight for airplane mode. More specifically to disclose the configuration of the joint wing aerostructure with multiple rotors.

DISCUSSION OF THE STATE OF THE ART

The helicopter is an essential modern air transportation vehicle. Technically, helicopter with rotary wing is also referred as "rotorcraft" or "rotary wing vehicle". The rotary wing is a plurality of airfoiled blades rotating on the same axis to generate thrust by moving air. The rotary wing is commonly referred as "rotor". A rotor positioned in the center of a shroud is called "ducted fan" or "ducted rotor". The rotor generates thrust to allow the helicopter to land and take-off vertically without the presence of a runway. Disadvantageously, helicopter with fossil fuel engine is associated with expensive operational cost, undesirable high level of noise and carbon emission.

As the traffic is increasing congested in the global urban area, an affordable electrical VTOL vehicle is a solution to avoid congestion on the road. Without traffic delay, an electrical VTOL vehicle can also operate as law enforcement vehicle, ambulance and medical cargo transporter. A new term UAM (urban air mobility) has been adopted for this new type of aerial transportation.

The arrival of distributed electrical propulsion system and advanced energy storage allows modern VTOL multirotor vehicle to substitute the traditional helicopter. The VTOL multirotor vehicle is advantageous for its safety redundancy, in comparison to a single large rotor helicopter. The electrical propulsion system contains multiple independent smaller rotors to provide lift, propulsion and steering control. The quad-rotorcraft is a popular design for electrical multirotor vehicle, which comprises of four rotors equally spaced apart. The fixed pitch smaller rotor has low inertia, which allows the speed of the rotating blade to be decreased or increased rapidly. The modulation of the power setting on the rotors creates a thrust vector for lift, propulsion and steering control. The disadvantage of the four rotors propulsion is that the rotors are smaller in diameter. Based on the momentum theory, small diameter rotor has lower thrust lift efficiency, due to the high disc loading.

Advantageously, modern electrical VTOL multirotor vehicle also has the capability to transition to airplane mode for forward flight. The energy required for VTOL flight is significantly higher than the energy required for a fix wing airplane flight to maintain forward flight. The VTOL vehicle can experience the following three types of flight mode: thrust borne, partial wing borne and wing borne. During VTOL_thrust borne flight, the airborne force is supported by direct vertical rotor thrust. Partial wing borne flight means the airborne force is a combination of direct vertical rotor thrust and wing lift. In wing borne flight, the airborne force is supported by the lift generated by the wing as the vehicle is moving forward. Furthermore, the forward propulsive movement in airplane mode is generated by at least one tiltable proprotor. As a result, the vehicle is required to transition between thrust borne flight configuration and wing borne flight configuration. The main challenge of this transitional capability is the rapid handover between thrust borne flight to wing borne flight and the vehicle has limited correctional recovery option during the transitional time frame. The desirable solution is to design the VTOL vehicle with partial wing borne flight without transitioning fully to wing borne flight. Moreover, another desirable solution is to design the VTOL vehicle with the capability of maintaining VTOL flight capability in the partial wing borne configuration.

Traditional fixed wing aircraft suffers from significant losses of lift efficiency at the tip of the wings, due to the occurrence of vortex. As a result, winglet, sharklet and box aerostructure design is introduced to improve lift efficiency.

BRIEF SUMMARY OF THE INVENTION

In one embodiment of the invention of a multirotor vehicle with both thrust borne and partial wing borne flight capability is provided, comprising a fuselage having a longitudinal axis, a longitudinally extended empennage, a vertical stabilizer, a rudder associated with an actuator is coupled to the vertical stabilizer, a pair of fixed wings is coupled to the upper fuselage, a pair of flaps associated with an actuator is coupled to the wings, a pair of canards is coupled to the lower fuselage, a pair of pylons is mechanically coupled together the wings and the canards, a pair of pivotable rotor booms associated with an actuator is coupled to the pylons, and a plurality of rotors driven by rotary movement are coupled to the pivotable rotor booms.

BRIEF DESCRIPTION OF THE DRAWINGS

Regarding the invention disclosure, the feature and advantage of the invention are particularly pointed and distinctly claimed in the claims. Detailed description and methods are given to provide further comprehension of the functionality of the invention. It should be observed that three mutual orthogonal directions X, Y, and Z are shown in some of the FIGURES. The first direction X is said to be "longitudinal", and the forward side is referenced to be positive. Rotational movement around the longitudinal axis is said to be "roll". The second direction Y is said to be "transverse", and the port side is referenced to be positive. And the Y plane is referenced as the median of the vehicle. Rotational movement around the transverse axis is said to be "pitch". Finally, the third direction Z is said to be "vertical", and the upside is referenced to be positive. Rotational movement around the vertical axis is said to be "yaw". Furthermore, the direction of motion or rotation is shown in hollow arrow and force vector is shown in solid arrow.

DETAILED DESCRIPTION OF THE EMBODIMENTS

Advantageously, VTOL (vertical take-off and landing) vehicle can operate without a long runway. However, thrust borne flight requires significantly higher energy than the energy required for a fixed wing aircraft to maintain forward flight. Therefore, the usefulness of VTOL vehicle is limited to short range flight. Modern VTOL vehicle is commonly designed with electrical power plant. In order to reduce the weight of electrical energy storage, an efficient VTOL vehicle can transition to airplane configuration for long range forward fight. In the disclosure of the invention, the technical term rotary wing is referred as "rotor". Moreover, the term "symmetric" is used to describe a component, feature, or element which is symmetrical with respecting to median plane of the rotorcraft. It is further understood that the terms "includes", "including", "comprises", "comprising", "couples", 'coupled", "mounts", and "mounted", when used herein, specify the presence of stated features, components and elements, without the further detail on the method of mechanical interconnexion. In addition, it is also understood that the singularity form "a", "an", and "the" used throughout the description are intended to include plural forms as well, unless the context clearly specifies otherwise.

Figure 1:
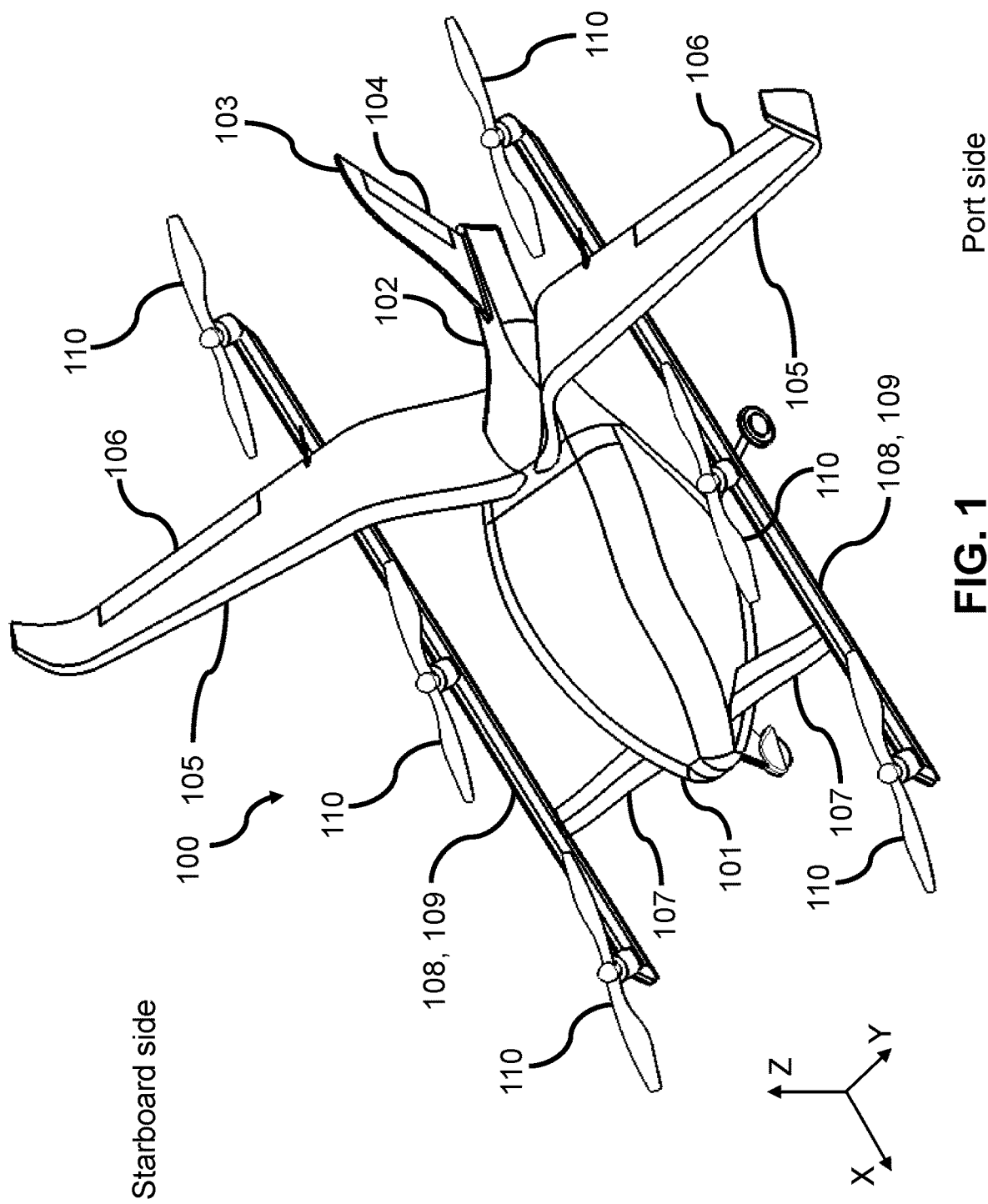
FIG. 1 is a perspective view of the multirotor vehicle in accordance with the first embodiment of the present invention with the rotor booms stowed.
Figure 2:
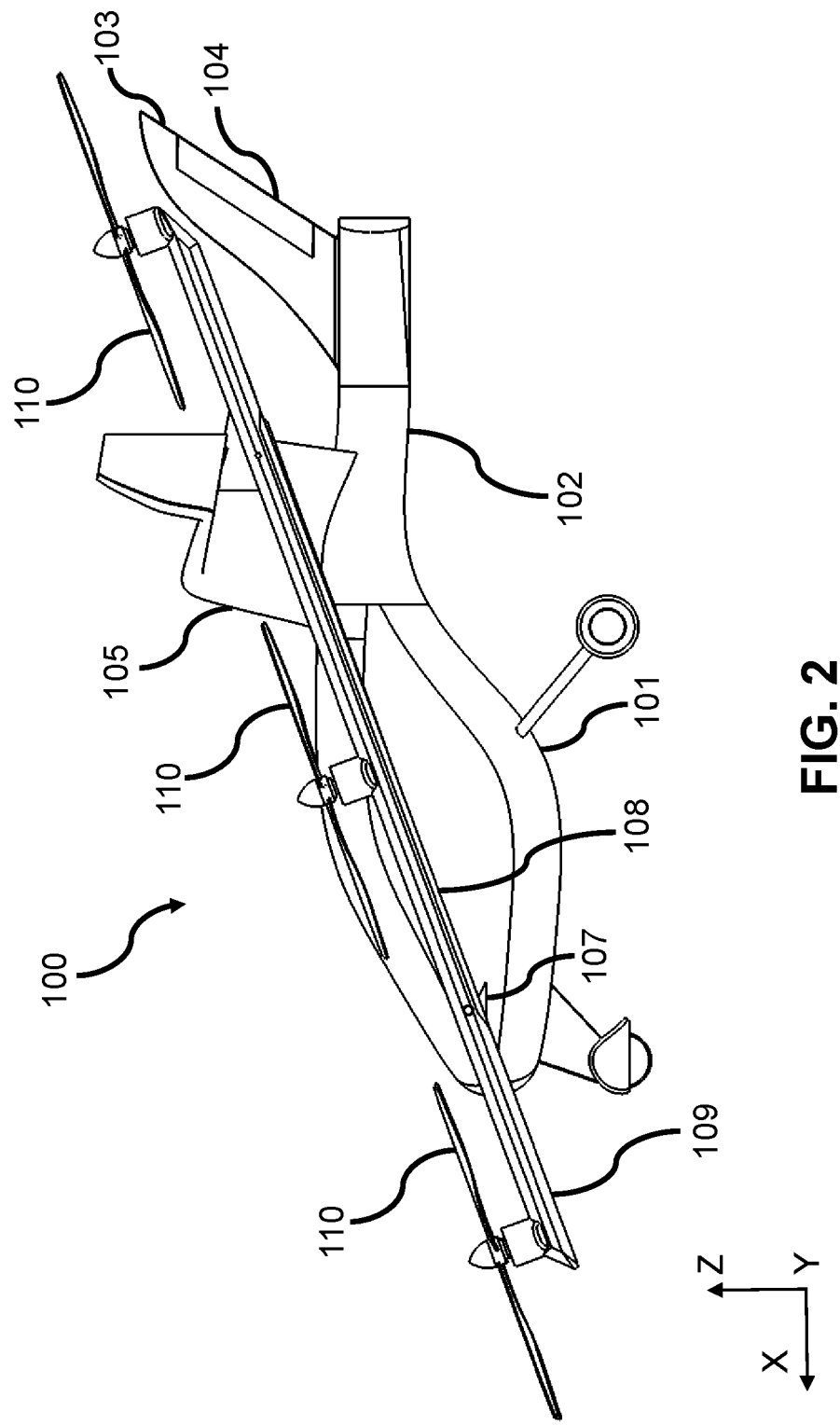
FIG. 2 is a side view from the embodiment of FIG. 1.
Figure 3:
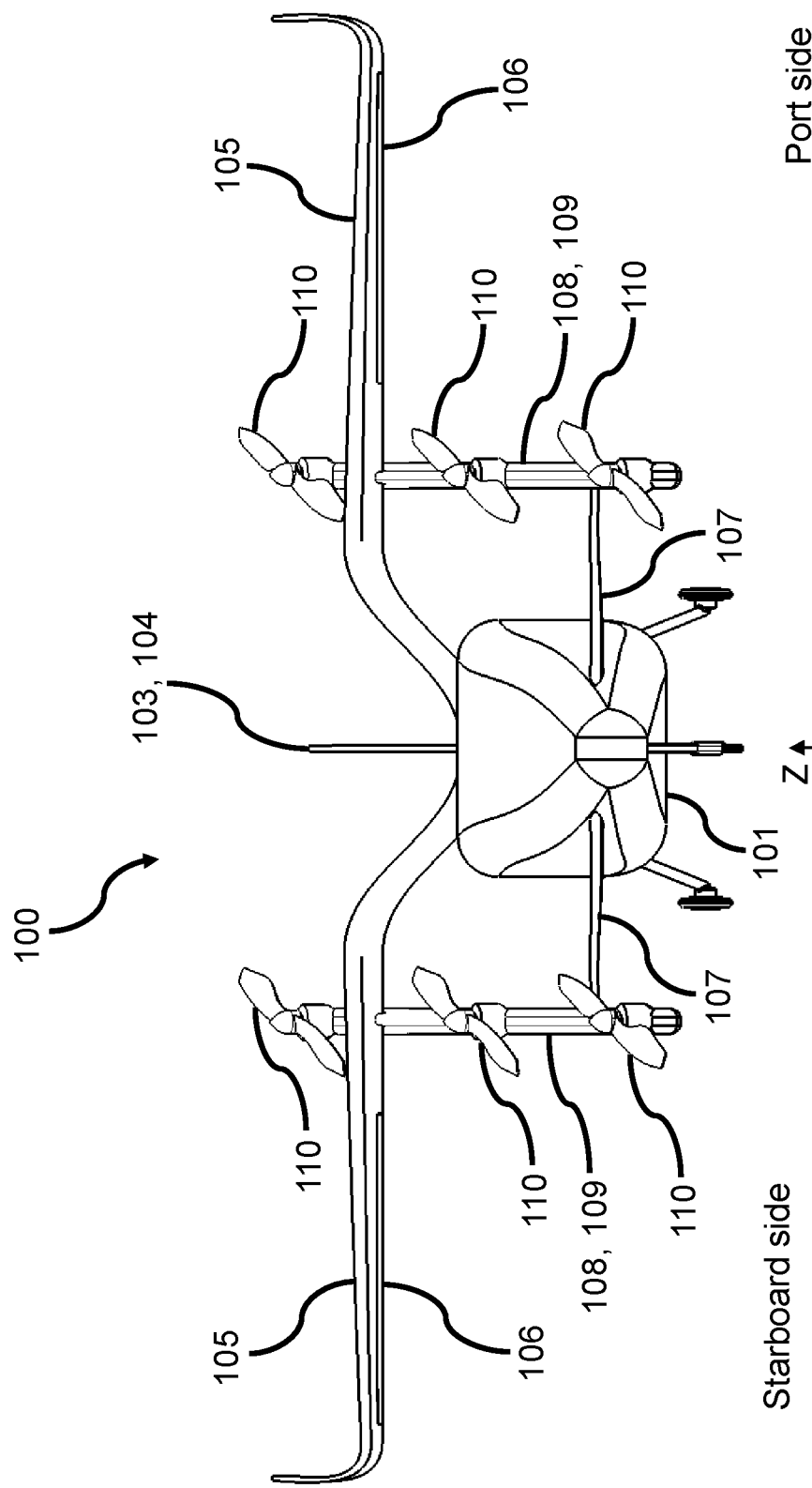
FIG. 3 is a frontal view from the embodiment of FIG. 1.
Figure 4:
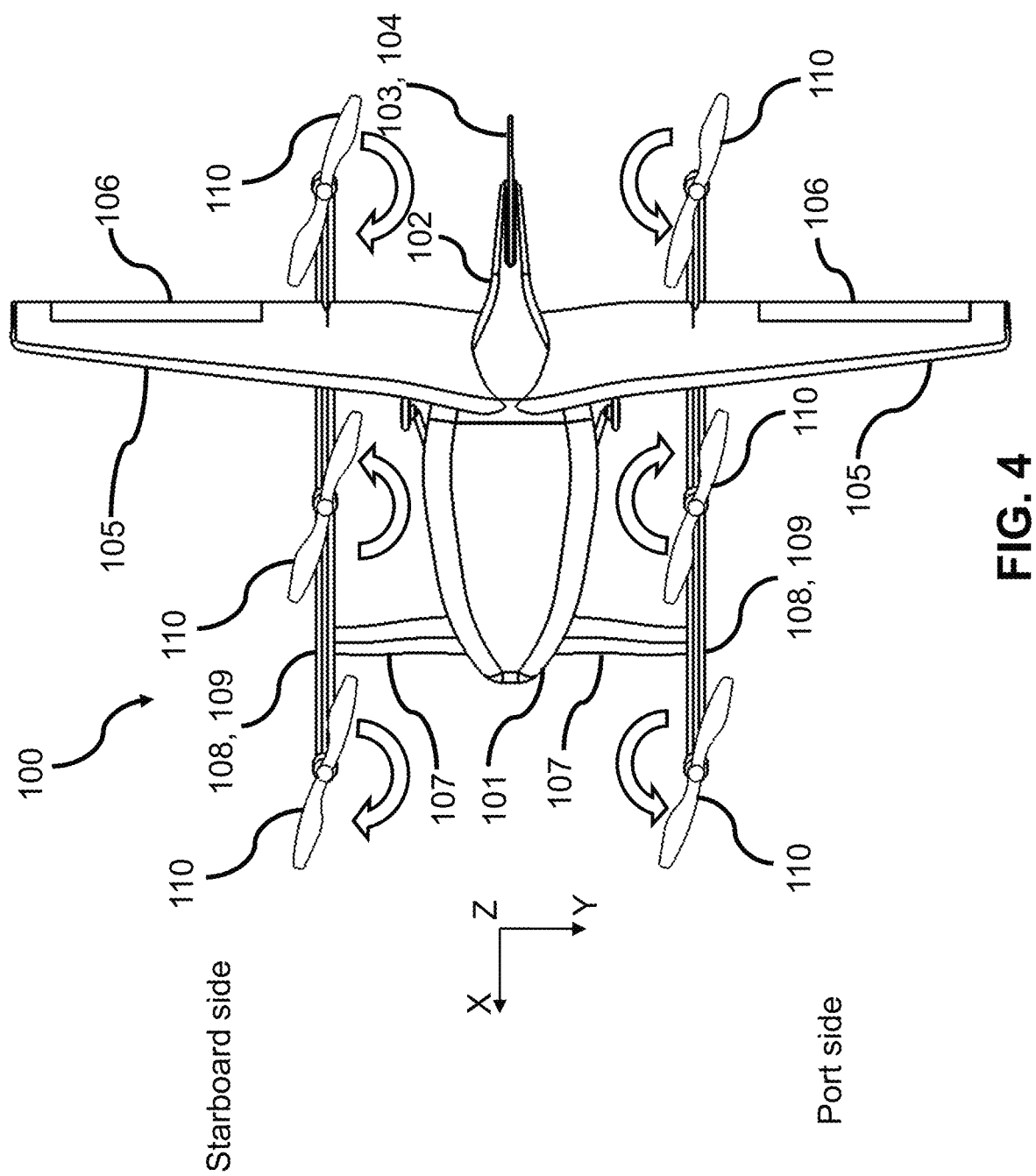
FIG. 4 is a top plane view from the embodiment of FIG. 1.
Figure 5:
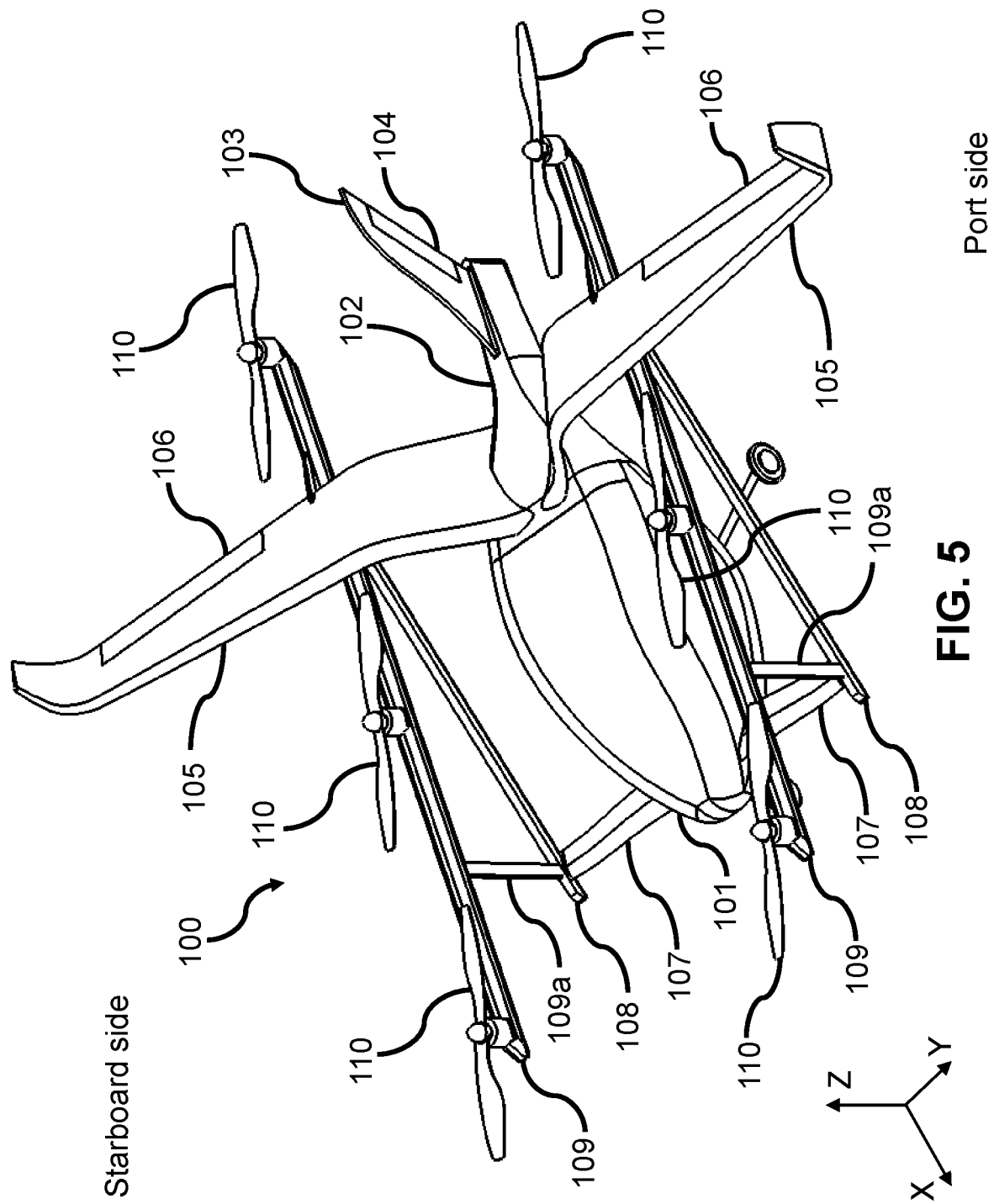
FIG. 5 is a perspective view of the multirotor vehicle in accordance with the second embodiment of the present invention with the rotor booms deployed.

As shown in FIGS. 1 to 4, the multirotor aerial vehicle from embodiment 100 suited for partial wing borne flight. FIG. 1 shows the multirotor vehicle 100 comprises of the fuselage 101, the empennage 102, the vertical stabilizer 103, the rudder 104, the wings 105, the flaps 106, the canards 107, the pylons 108, tiltable rotor booms 109, and a plurality of rotors 110. The longitudinally extended fuselage 101 is coupled together with the longitudinally extended empennage 102. The proximal end of the vertical stabilizer 103 is coupled to the empennage 102. The rudder 104 associated with an actuator is coupled to the vertical stabilizer 103. The proximal ends of the transversely extended symmetric wings 105 are coupled to the upper portion of the fuselage 101. Naturally, the center of the wing's lift force is positioned near the center of gravity of the vehicle along the longitudinal direction. The flaps 106 associated with an actuator are coupled to the wings 105. The proximal ends of the transversely extended symmetric canards 107 are coupled to the lower portion of the fuselage 101. The pylons 108 form the box aerostructure by coupling the distal ends of the canards 107 to the wings 105. The tiltable rotor booms 109 associated with an actuator are coupled to the pylons 108. As shown in FIG. 2, the rotor booms 109 in the stowed position are integrated with the pylons 108, in which the rotor booms 109 are canted forward relative to the longitudinal axis of the vehicle. The tiltable rotor booms 109 are provided with a plurality of rotors 110 along the longitudinal span. Embodiment 100 is an example having three rotors 110 on each of the tiltable rotor booms 109, but the possibility is not limited to three rotors 110. A practical application can have two, three, four, five or six rotors 110 provided on each of the rotor booms 109. Moreover, the rotors 110 can have two blades or co-rotation rotors of four blades. The plurality of rotors 110 can have fixed pitch or variable pitch blade to achieve optimal operational efficiency for both thrust borne flight and wing borne flight. It can be observed on FIG. 2, the plurality of rotors 110 appear to share a common rotational plane. However, the plurality of the rotors 110 can be strategically arranged to angle the axis of rotation of adjacent rotors. As a result, the adjacent rotors are not rotating side by side on the same rotational plane, it reduces the risk of rotor burst debris intersecting a neighboring rotor. Rotor burst is a term frequently used to describe the occurrence of a rotor blade failure.

Figure 6:
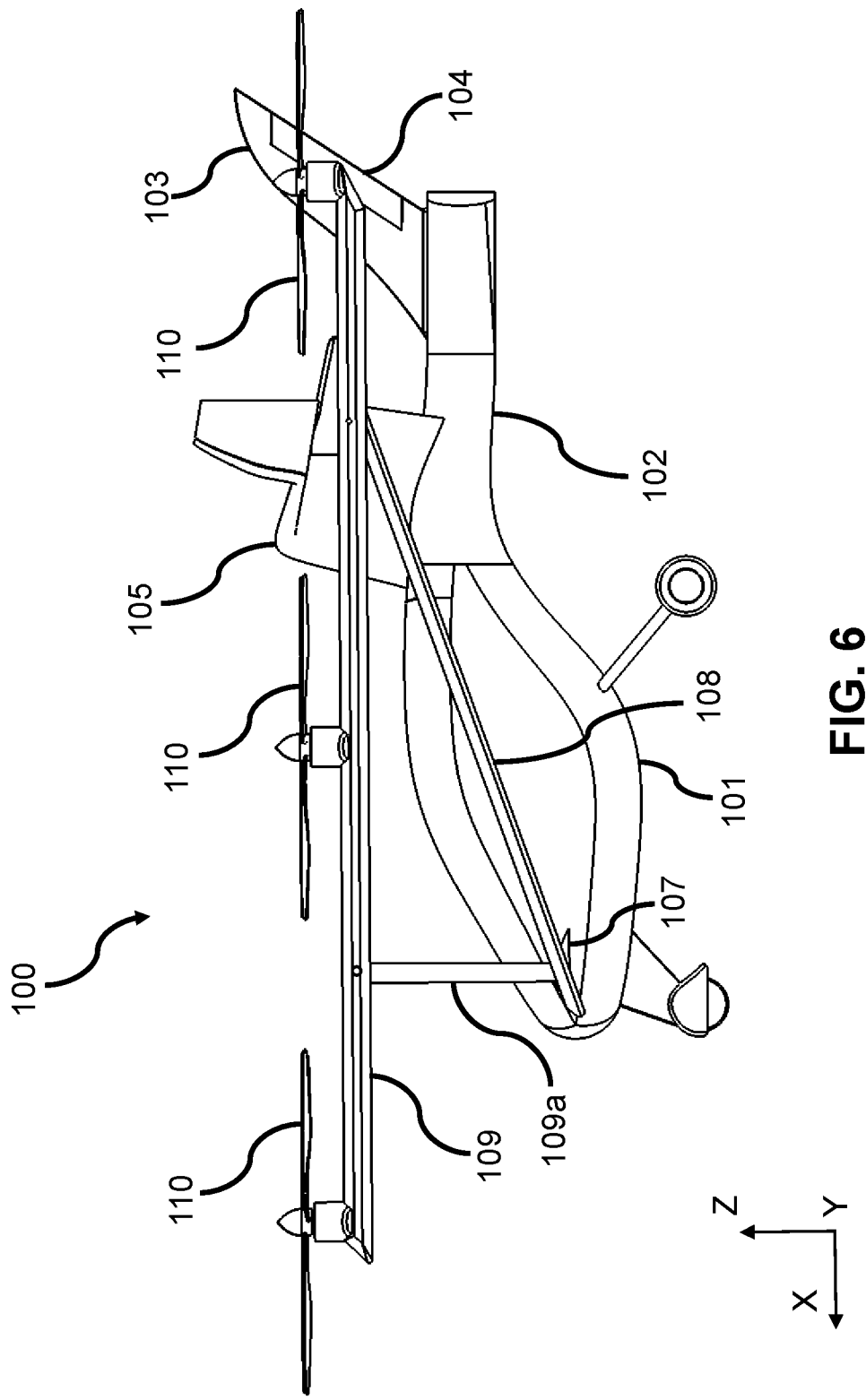
FIG. 6 is a side view from the embodiment of FIG. 5.
Figure 7:
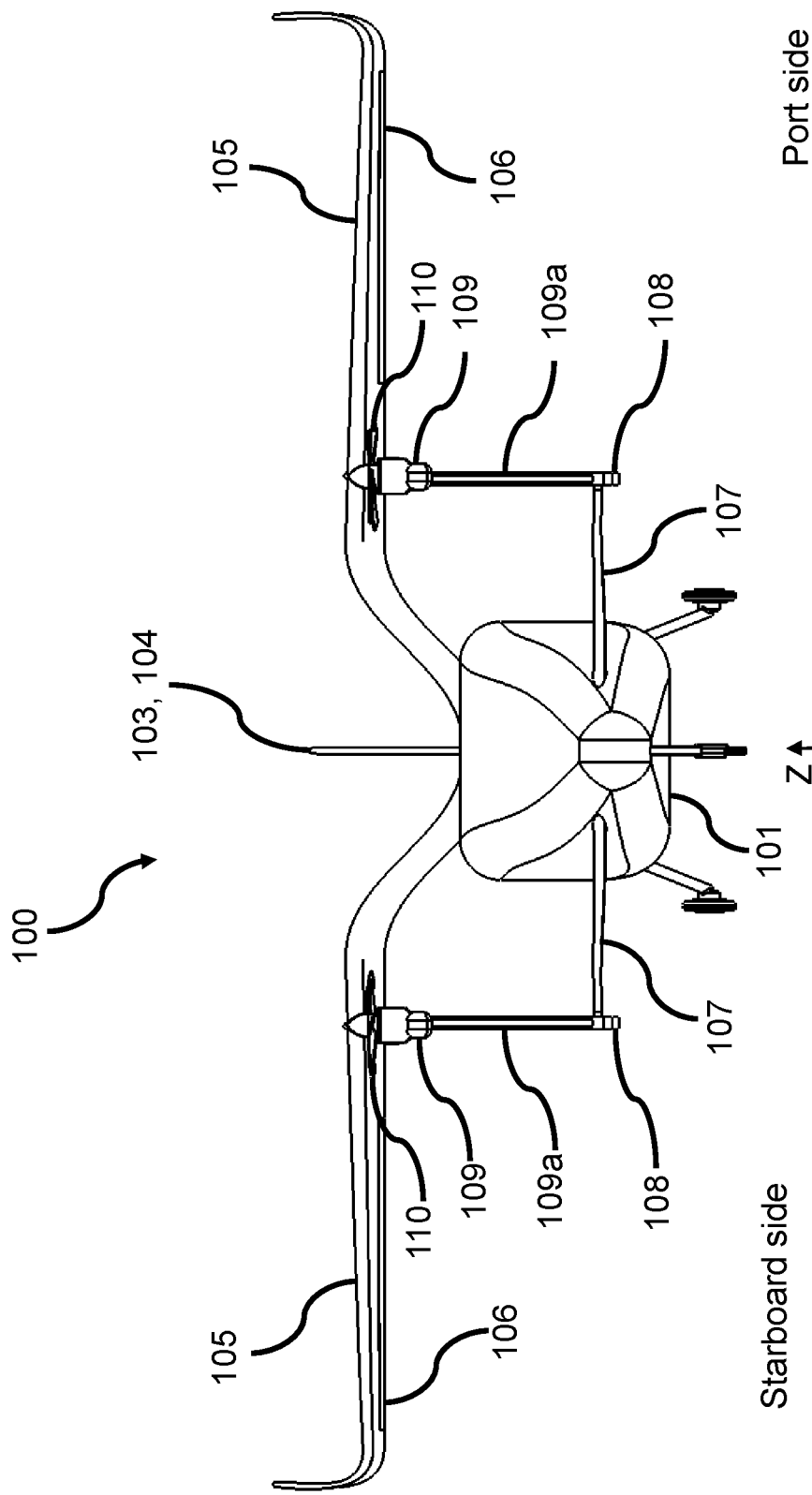
FIG. 7 is a frontal view from the embodiment of FIG. 5.
Figure 8:
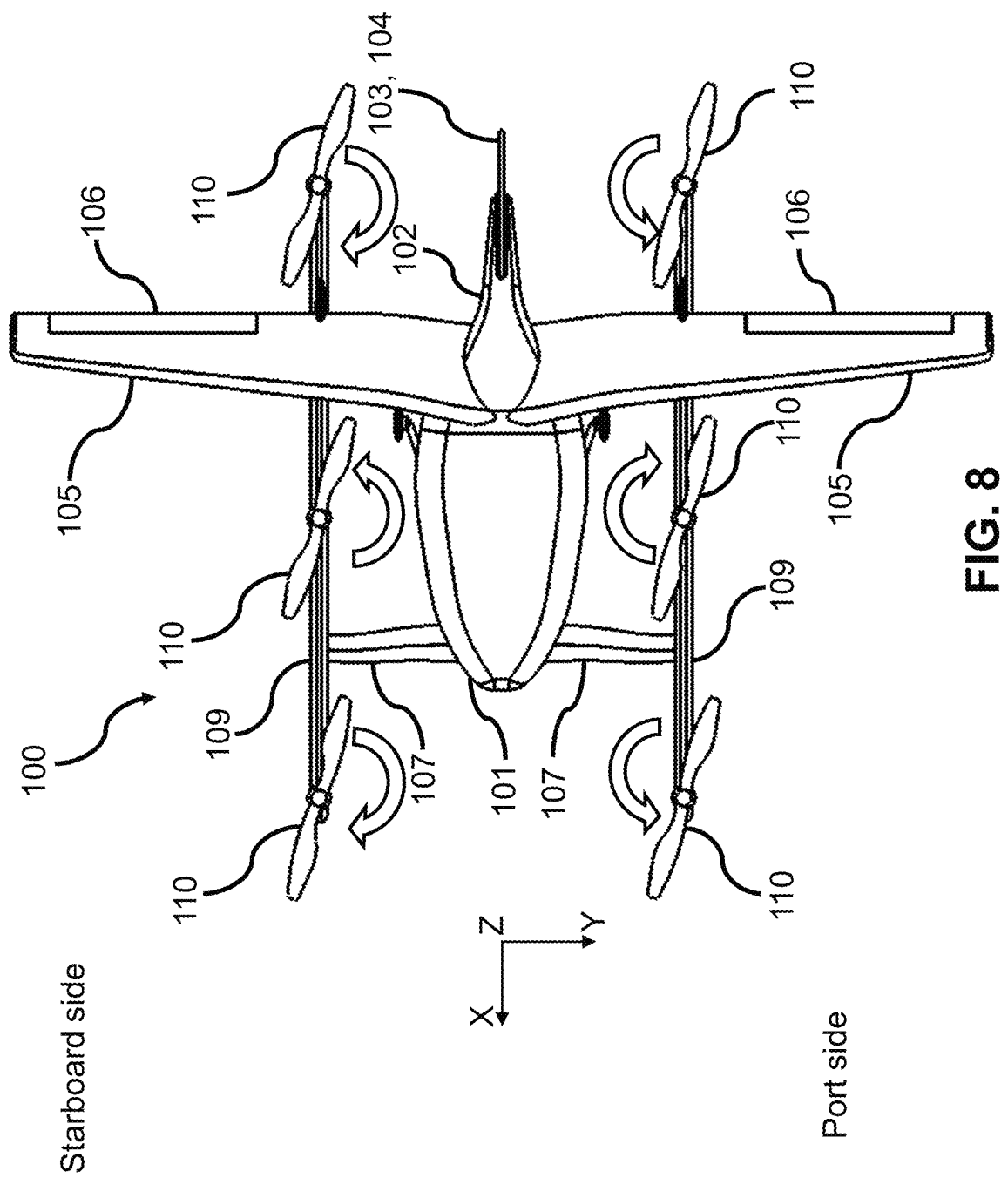
FIG. 8 is a top plane view from the embodiment of FIG. 5.

As shown in FIGS. 5 to 8, the multirotor aerial vehicle from embodiment 100 suited for thrust borne flight. It is shown in FIG. 6, the rotor booms 109 are in the deployed position, in which the rotor booms 109 are tilted upward to be oriented in parallel with the longitudinal axis of the vehicle. The higher position of rotor booms 109 keeps the rotational plane of the rotors 110 above the height of a person and allows entry or exit door on the side of the fuselage 101. The movement of the tiltable rotor booms 109 is achieved by the linear displacement of the linkage 109a. The mechanical system can be observed in FIG. 6, the forward portion of the rotor booms 109 is hinged to the linkage 109a and the rearward portion of the tiltable rotor booms 109 is hinged to the pylons 108. The free end of the linkages 109a have a hinged attachment point associated with a hydraulic piston actuator, electrical linear actuator or ballscrew actuator. The resultant linear displacement of the actuator drives the linkages 109a to provide the tilting movement to the rotor booms 109. Moreover, the movement of the rotor booms 109 can be synchronized by mechanically coupling the ball screw actuators to a single rotary driven movement. With the rotor booms 109 in the deployed position, the linkages 109a are oriented vertically to transfer the sum of the rotors 110 forward lift force to the vehicle via the pylons 107. Moreover, the sum of the rotors 110 rear lift force is transferred to the vehicle via the wings 105.

The operation in different flight configurations is described in the following section. The multirotor vehicle 100 has six rotors 110 to operate in thrust borne flight (VTOL mode). As shown in FIG. 6, the tiltable rotor booms 109 are in the deployed position. As result, the thrust vectors of rotors 110 are directed vertically downward. An example of the rotational direction of the rotors 110 is shown by the hollow arrow in FIG. 8. As a result of the counter-rotation nature of each pair of rotors 110, the torque effect is net zero for each pair of rotors 110 operating at the same power setting. Moreover, the modulation of the rotors 110 power setting creates a desirable torque effect to assist the vehicle to change yaw heading. The six rotors 110 naturally generate the thrust vector required for various thrust borne flight maneuvers, including take-off, landing, hovering, vertical flight, as well as flying forward, backward, and sideways.

Figure 9:
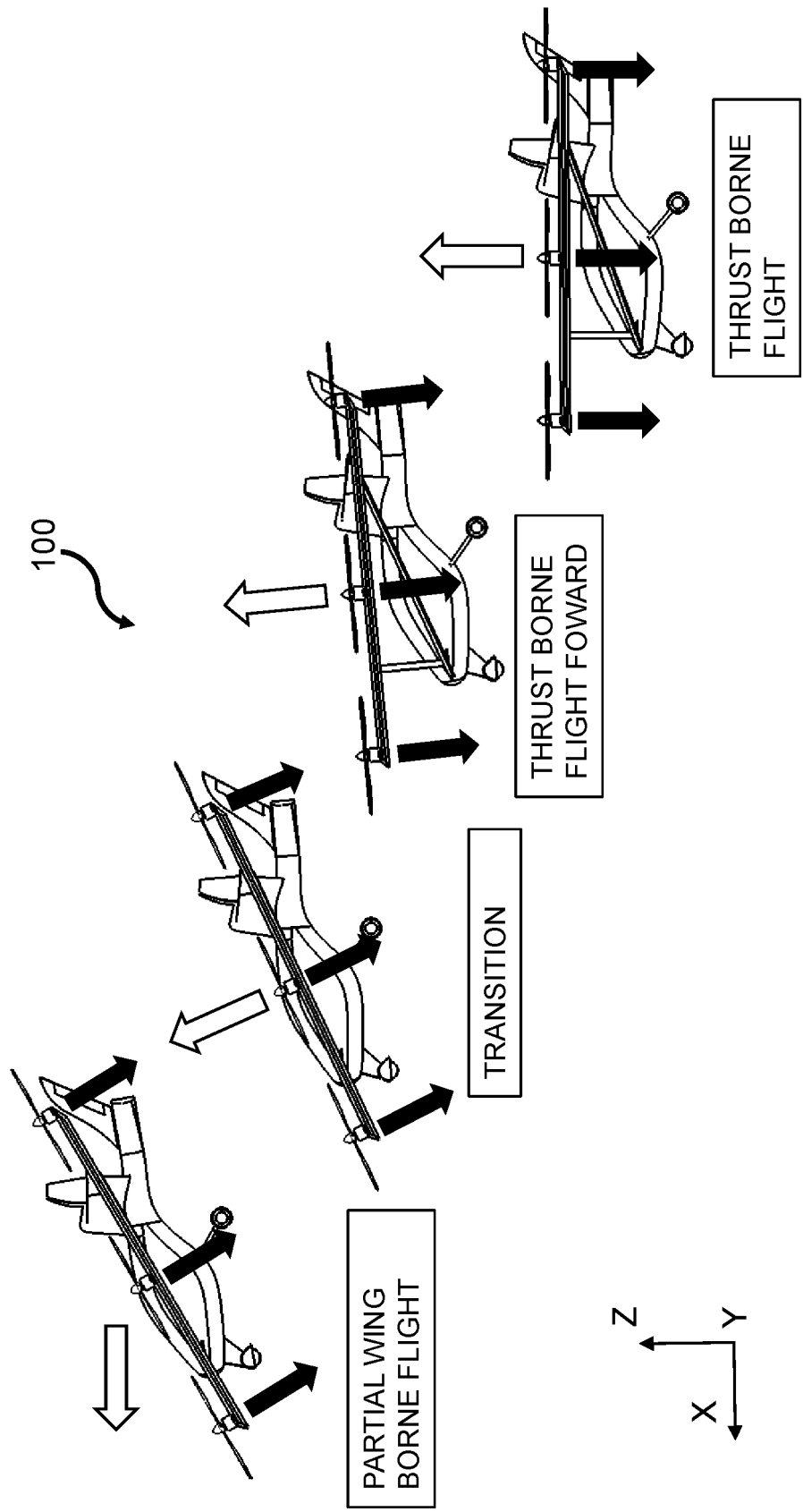
FIG. 9 is a side view of the multirotor aerial vehicle in a first flight mode.

In order to transition from thrust borne flight (VTOL mode) to partial wing borne flight (airplane mode), the tiltable rotor booms 109 require tilting downward from the horizontal position for thrust borne flight configuration to the canted position for partial wing borne flight configuration. FIG. 9 shows the steps of the transitional flight. Upon achieving thrust borne vertical flight, the vehicle initializes the forward thrust borne flight by tipping forward. The tipping forward maneuver changes the orientation of the rotor thrust vector from downward direction to a downward and rearward direction. Naturally, the wing lift force increases and the overall vertical thrust lift force decreases, as the vehicle gains higher forward speed in horizontal thrust borne flight. For example, the wings 105 have a positive angle of incidence to maintain a positive angle of attack as the vehicle is tipped forward. As an example, the wings 105 can have a positive angle of incidence of 20° to allow the vehicle to tip forward up to 15°. During the transitional step, the tiltable rotor booms 109 adjust collectively the direction of the rotors 110 thrust vector. Initially the tiltable rotor booms 109 are parallel to the longitudinal axis of the vehicle, and after the transitional step, the tiltable rotor booms 109 are canted forward relative to the longitudinal axis of the vehicle. As observed on FIG. 2, the tiltable rotor booms 109 are stowed against the pylon 108 in the partial wing borne flight configuration. The tiltable rotor booms 109 in the stowed position allows further increase of horizontal rotor thrust to propel the vehicle forward and reduce vertical rotor thrust. Meanwhile, the thrust vector of the rotors 110 maintains a vertical force component to lift the vehicle and a horizontal force component to propel the vehicle forward, during the partial wing borne flight. As observed in FIG. 2, that rotors 110 located forward of the wings 105 are placed below the wings 105. Beneficially, the wings 105 are not affected by the upwash and downwash flow of the rotors 110. Therefore, undisturbed ram air flow interacts with wings 105 to generate airfoil lift force. The flaps 106 can be extended to increase wing lift force during lower forward speed flight and gliding flight. The vehicle is known to be in partial wing borne flight due to the sum of the airborne lift force contributed by the wings 105 and rotors 110. This process allows a smooth transition between thrust borne flight to partial wing borne flight. During partial wing borne flight, the thrust vectors of the rotors 110 provides the flight control capability to steer the vehicle in the pitch, roll and yaw axis. The rudder 104 and flaps 106 can provide complimentary flight control and trimmable adjustment for heading, levelling, speed and attitude of the vehicle. As observed in FIG. 2, the structural integrity of the fuselage 101, wings 105 and vertical stabilizer 103 are placed outside of the rotational plane of the rotors 110. Beneficially, any rotor burst debris will not intersect with any flight-critical component and the fuselage 101 holding the cargo, passenger or pilot. In addition, the energy storage is placed far away from the rotor burst plane in the lower portion of the fuselage 101.

Figure 10:
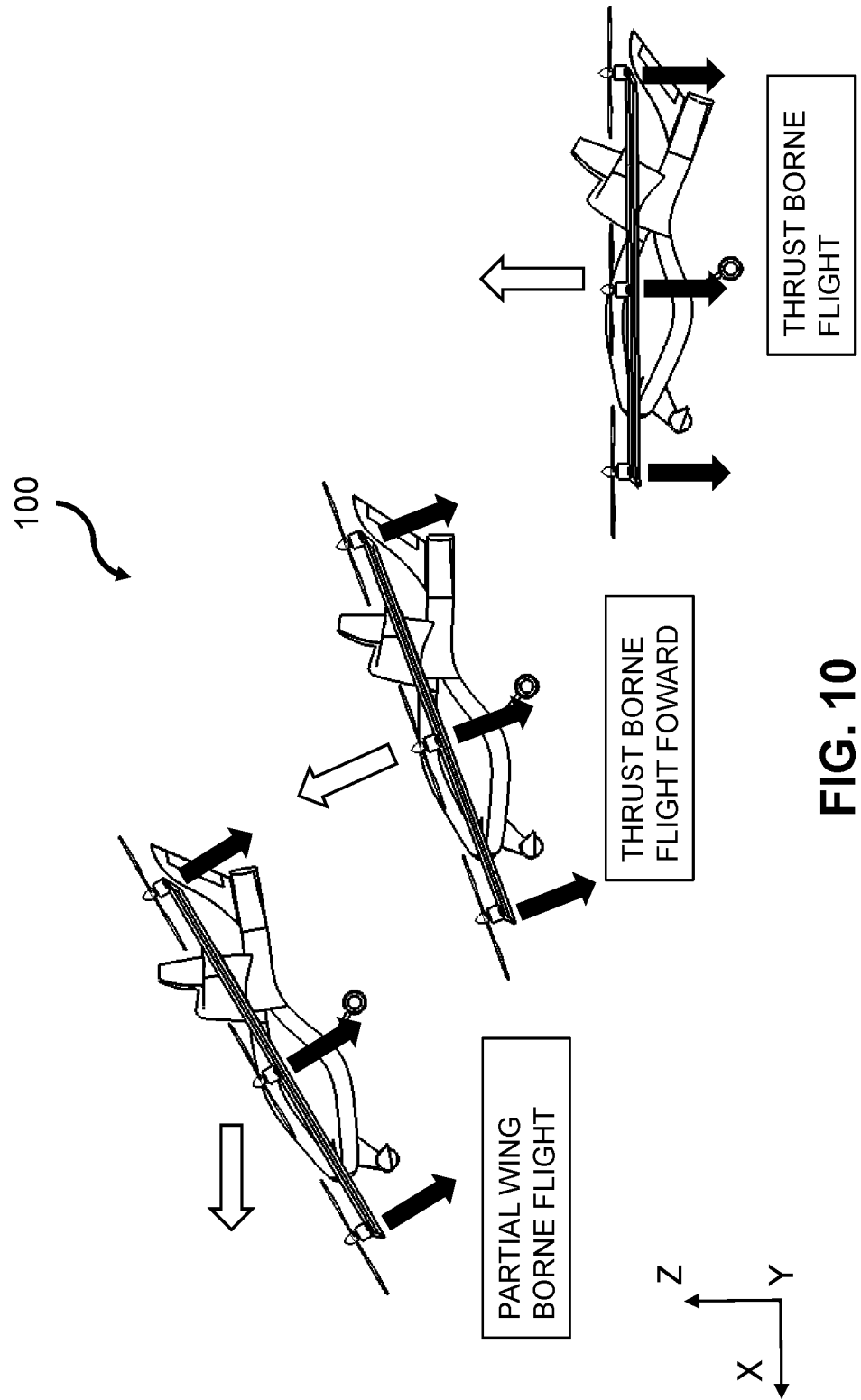
FIG. 10 is a side view of the multirotor aerial vehicle in a second flight mode.

The vehicle also has a second thrust borne flight mode. As shown in FIG. 10, the tiltable rotor booms 109 in the stowed position are integrated into pylon 108. The vehicle can also achieve thrust borne flight in VTOL mode by tipping backward the fuselage 101 to orient the rotor thrust vertically. Upon achieving thrust borne vertical flight, the vehicle initializes the forward thrust borne flight by tipping forward to change the orientation of the rotor thrust vector from downward direction to a downward and rearward direction. Finally, the vehicle reaches a certain forward speed and transition to partial wing borne flight.

Figure 11:
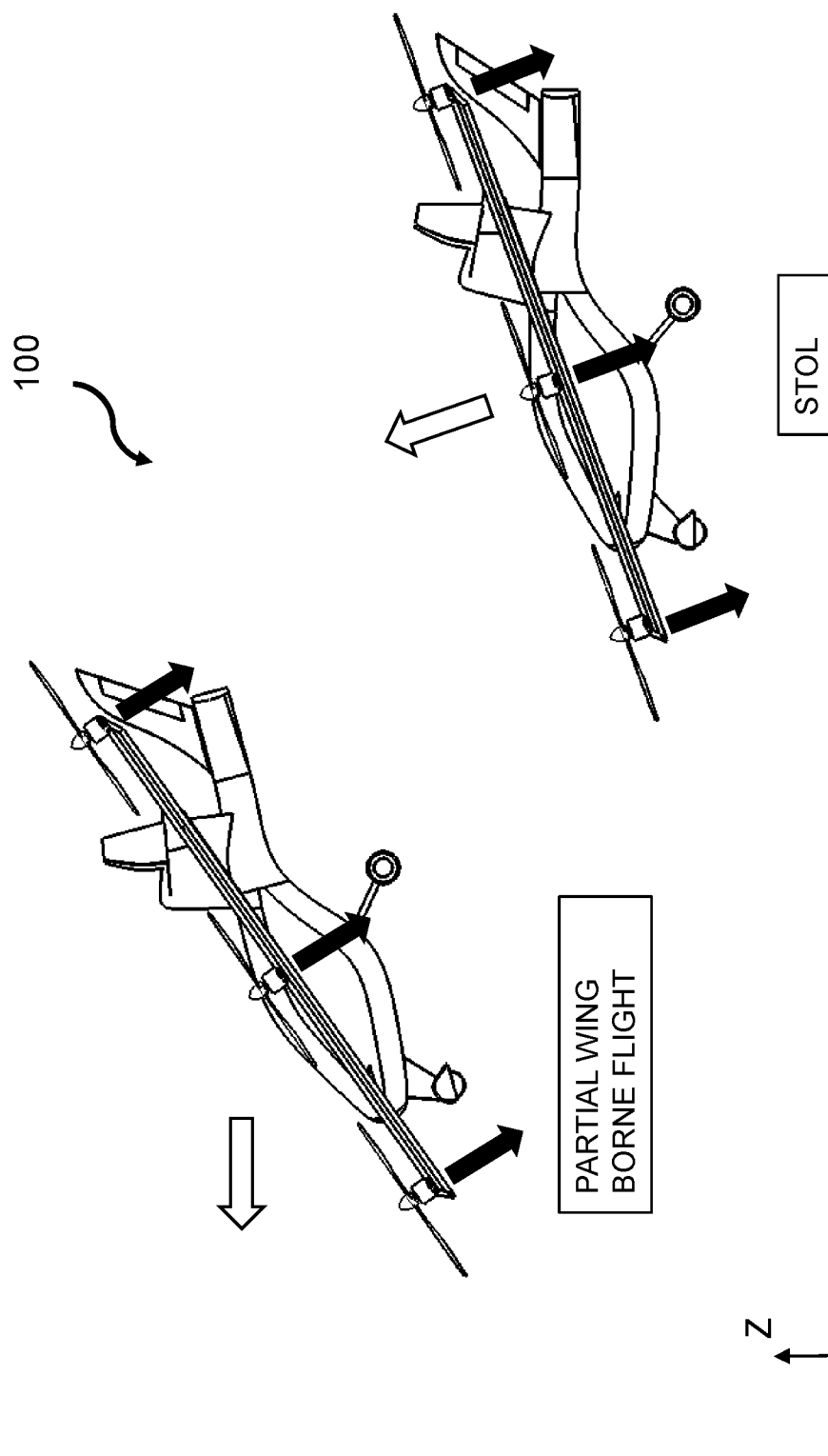
FIG. 11 is a side view of the multirotor aerial vehicle in a third flight mode.

FIG. 11 shows the vehicle also has STOL (short takeoff and landing) capability, if a short runway is available. As shown in FIG. 11, the tiltable rotor booms 109 in the stowed position are integrated into the pylon 108. It can be observed that the thrust vector of the rotors 110 is propelling the vehicle forward and vertically up. Upon airborne, the vehicle starts to tip forward to gain faster forward speed. Finally, the vehicle reaches a certain forward speed and transition to partial wing borne flight.

Naturally, there are numerous variations, modifications and alternative configurations which can be made hereto without departing from the scope of the disclosure invention. It should be understood that the embodiments are for illustrative and explanatory purpose, and it is not conceivable to identify exhaustively all possible embodiments. In particular, it is important to observe that the invention described a multirotor aerial vehicle with specific position along with orientation of the rotors adopted for thrust borne flight and partial wing borne flight. The actuation of the rotor booms allows the rotors to transition between thrust borne flight and partial wing borne flight. The configuration of the rotors in the partial wing borne flight can also achieve STOL operation. Furthermore, the multirotor aerial vehicle can achieve full functional thrust borne flight with the rotors in the partial wing borne configuration. Moreover, the rotors in partial wing borne flight are positioned and oriented to avoid any propwash disruption over the clean wings, which is beneficial for decreasing noise and improving wing lift performance. Finally, the box aerostructure benefits from an improvement of structural strength, fatigue strength and load carrying strength. Nevertheless, the invention is applicable to any multirotor vehicle of arbitrary weight, such as a light drone to a large tonnage vehicle.

The invention claimed is:

1. A multirotor vehicle capable of VTOL (vertical take-off and landing) and partial wing borne flight comprising:
    a longitudinally extending fuselage, said fuselage comprising:
    an upper portion;
    a lower portion;
    a rear portion; and
    a longitudinal axis;
    a longitudinally extending empennage coupled to the rear portion of the fuselage;
    a vertical stabilizer coupled to the empennage;
    a rudder coupled via an actuator to the vertical stabilizer;
    a pair of wings coupled to the upper portion of the fuselage;
    a pair of flaps coupled via a set of actuators to the wings;
    a pair of canards coupled to the lower portion of the fuselage;
    a pair of pylons coupled together at distal ends of the canards to the wings;
    a pair of tiltable rotor booms coupled to the pylons;
    a pair of linkages driven by a linear actuator to tilt the tiltable rotor booms; and
    a plurality of rotors coupled along a longitudinal span of the rotor booms.

2. The multirotor vehicle as set forth in claim 1, wherein said plurality of rotors include a set of blades with variable collective pitch.

3. The multirotor vehicle as set forth in claim 1, wherein said plurality of rotors include a configuration of a twin set of co-rotating rotors with two blades.

4. The multirotor vehicle as set forth in claim 1, wherein said pair of tiltable rotor booms can tilt along a pitch axis to change collectively a thrust vector of said plurality of rotors.

5. The multirotor vehicle as set forth in claim 1, wherein said plurality of rotors have an axis of rotation strategically arranged with an angled offset to minimize rotor burst debris intersecting neighboring rotors and the fuselage.

6. The multirotor vehicle as set forth in claim 1, wherein said plurality of rotors provide the thrust vector to hover, fly up, fly down, fly forward, fly backward, fly sideways and change yaw heading during thrust borne flight.

7. The multirotor vehicle as set forth in claim 1, wherein said plurality of rotors provide the thrust vector to fly forward, pitch, roll and yaw during partial wing borne flight.

8. The multirotor vehicle as set forth in claim 1, wherein said rudders and said pair of flaps provide complimentary flight control for pitch, roll and yaw during partial wing borne flight.

9. The multirotor vehicle as set forth in claim 1, wherein said rudders and said pair of flaps provide trimmable adjustment to correct heading, levelling, speed and attitude during partial wing borne flight.

10. The multirotor vehicle as set forth in claim 1, wherein said pair of flaps is extendable to increase a wing airfoil lift force during partial wing borne flight, gliding flight and STOL operation.

11. The multirotor vehicle as set forth in claim 1, wherein said pair of tiltable rotor booms in a deployed position are pitched upward to be oriented parallel to the longitudinal axis of said fuselage.

12. The multirotor vehicle as set forth in claim 11, wherein said pair of tiltable rotor booms in the deployed position direct the thrust vector vertically downward.

13. The multirotor vehicle as set forth in claim 11, wherein said pair of tiltable rotor booms in the deployed position are suitable for thrust borne flight by maintaining said fuselage levelled.

14. The multirotor vehicle as set forth in claim 11, wherein said pair of tiltable rotor booms in the deployed position places the plurality of rotors above an egress and ingress passage on lateral sides of said fuselage.

15. The multirotor vehicle as set forth in claim 1, wherein said pair of tiltable rotor booms in a stowed position are canted relative the longitudinal axis of said fuselage.

16. The multirotor vehicle as set forth in claim 15, wherein said pair of tiltable rotor booms in the stowed position direct the thrust vector canted downward and rearward.

17. The multirotor vehicle as set forth in claim 15, wherein said pair of tiltable rotor booms in the stowed position are suitable for partial wing borne flight and STOL (short take-off and landing) operation.

18. The multirotor vehicle as set forth in claim 15, wherein said pair of tiltable rotor booms in the stowed position are suitable for thrust borne flight by tipping said fuselage backward.

19. The multirotor vehicle as set forth in claim 15, wherein said pair of tiltable rotor booms in the stowed position keeps any flight-critical component and occupant or cargo outside of a rotor burst debris field.

* * * * *